April 3, 1934.  H. L. WALKER  1,953,664
SCALE
Filed May 27, 1932

INVENTOR.
HAROLD L. WALKER,
BY Duell, Dunn & Anderson.
ATTORNEYS.

Patented Apr. 3, 1934

1,953,664

UNITED STATES PATENT OFFICE 1,953,664

SCALE

Harold L. Walker, Brooklyn, N. Y., assignor to The Jacobs Bros. Co. Inc., Brooklyn, N. Y., a corporation of New York Application May 27, 1932, Serial No. 613,888

3 Claims. (Cl. 265—68)

This invention relates to a functionally and structurally improved scale.

It is an object of the invention to provide a scale, the parts of which may be readily assembled and set up, and which parts will be relatively few in number and individually simple and rugged in construction so that when the scale is assembled the apparatus will render efficient service over long periods of time with freedom from difficulty.

A further object of the invention is that of providing a scale in which just the proper degree of adjustment may be quickly secured and in which the parts may be coupled with facility.

With these and other objects in mind, reference is had to the attached sheet of drawing illustrating one practical embodiment of the invention and n whch:

Figure 1:
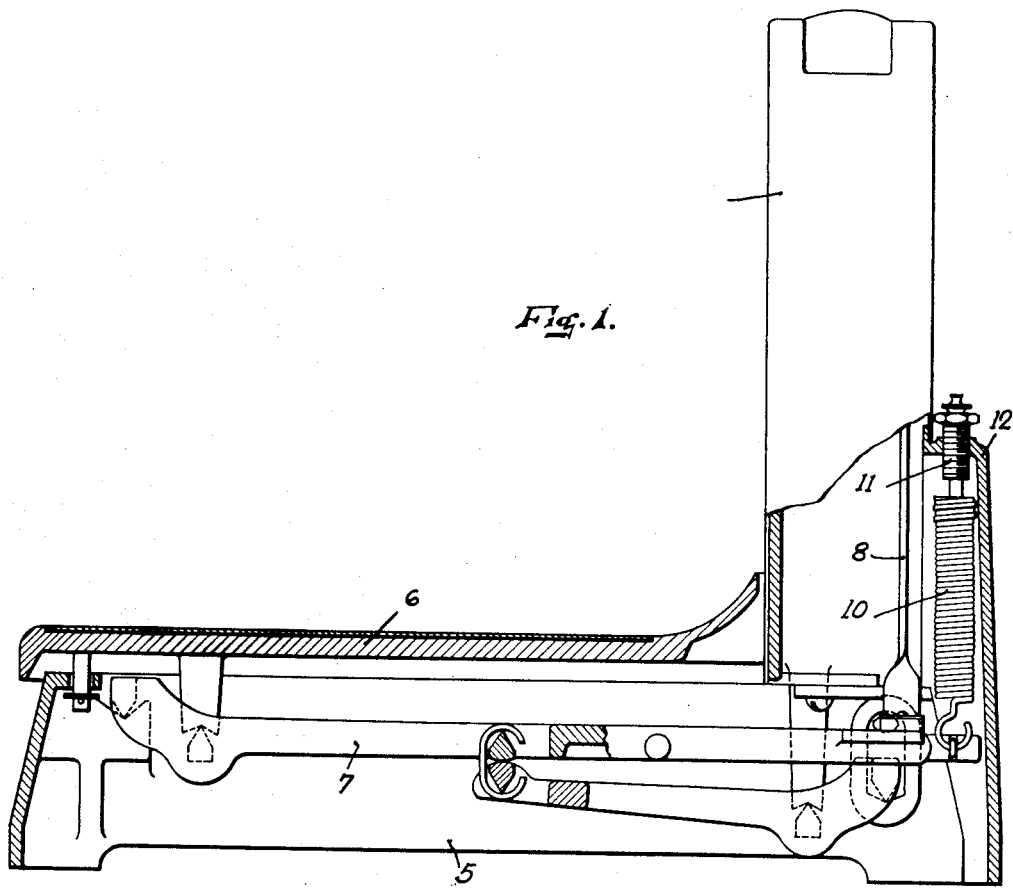
Fig. 1 is a fragmentary, partly sectional side view of a scale.

In these views the numeral 5 indicates a scale base above which a platform 6 is supported by means of a beam structure 7. The beam is connected by a rack bar 8 to a registering mechanism (not shown) within a housing 9 fixed to the base 5.

As afore brought out, the present illustration is intended to show merely one practical embodiment of the invention. Thus, it will be appreciated that the registering mechanism and the general type of scale might be changed in many particulars without departing from the spirit of the present invention. In any event, movement of the beam is resisted by a spring 10 which is coupled to the outer beam end and the upper end of this spring is connected to a screw threaded adjusting sleeve 11 mounted by a casing portion 12 so that the tension on the spring may be varied as desired.

Figure 3:
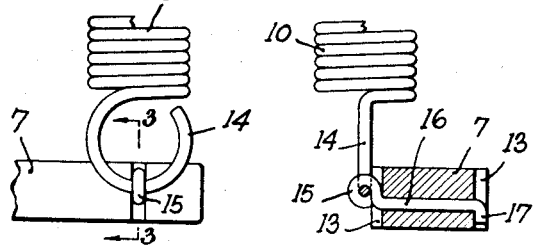
Fig. 3 is a transverse sectional view, taken along the lines 3—3 and in the direction of the arrows as indicated in Fig. 2.

Referring primarily to the connection between the lower end of the spring and the beam, it will be observed, as in Fig. 3, that the beam is formed with a transversely extending opening and adjacent the ends of the opening the beam edges are grooved as at 13. The lower end of the spring terminates in a loop or hook 14 and this hook passes through the coiled end 15 of a rod 16, the opposite end of which is bent downwardly as at 17. Consequently, it is apparent that the spring 10 may not turn due to its connection with the rod 16. The latter is in turn prevented from shifting due to the fact that it is lodged within the body of the beam, and also for the reason that its ends rest within the grooves 13.

Figure 2:
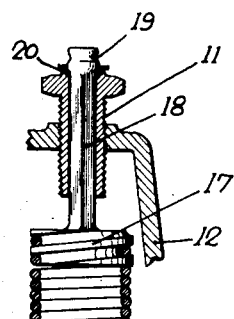
Fig. 2 is an enlarged view of certain of the parts as shown in Fig. 1.

Referring to the connection existing at the upper end of the spring, it will be apparent, as shown in Fig. 2, that a grooved plug 17 is employed and that the convolutions of the spring adjacent its upper end rest within the grooves of such plug. The plug is continued in the form of a shank 18 extending through the opening in the housing portion 12. Rotatably encircling this shank is the threaded sleeve 11 and it is obvious that an operator in "setting up" the scale may grip the upper end of the shank 18 and shift the same to a point at which the registering mechanism indicates a condition of even balance. Thereupon by simply enlarging the protruding end of the shank as at 19 and by the use of a blow or pressure, any withdrawal of the shank into the sleeve is prevented. It will also be observed that a washer 20 is interposed between the sleeve and the enlargement 19, as a consequence of which, free rotation of these parts is permitted, one with respect to the other. Accordingly, fine adjustments may readily be achieved by simply rotating the sleeve, and this is true of both the operator who assembles the scale, as well as the subsequent user.

Thus, among others, the several objects of the invention as specifically aforenoted, are achieved. Obviously, numerous changes and rearrangements of the parts, may be resorted to without departing from the spirit of the invention as defined by the claims.

Having described my invention, what I claim as new and desire to secure by Letters Patent is:

1. A scale including, in combination, a rockingly mounted beam, a spring and means connecting one end of said spring to said beam, a rod engaging said spring and formed with offset end portions, at least one edge of said beam being grooved to accommodate one of said offset end portions.

2. A scale including, in combination, a rockingly mounted beam, a spring and means connecting one end of said spring to said beam, a rod engaging said spring and formed with offset end portions, the edges of said beam being grooved to accommodate the offset end portions of said rod.

3. A scale including, in combination, a rockingly mounted beam, a spring connected to said beam, means for mounting said spring, said means comprising a rotatable sleeve, means for mounting the same and a member engaging the end of said spring and rotatably supported by said sleeve, said member extending beyond said sleeve and being enlarged to prevent its withdrawal within the same.

HAROLD L. WALKER.